United States Patent
Katsuki et al.

(10) Patent No.: US 10,467,546 B2
(45) Date of Patent: *Nov. 5, 2019

(54) PREDICTING A CONSUMER SELECTION PREFERENCE BASED ON ESTIMATED PREFERENCE AND ENVIRONMENTAL DEPENDENCE

(71) Applicant: International Business Machines Corporation, Armonk, NY (US)

(72) Inventors: Takayuki Katsuki, Tokyo (JP); Takayuki Osogami, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 312 days.

This patent is subject to a terminal disclaimer.

(21) Appl. No.: 14/827,521

(22) Filed: Aug. 17, 2015

(65) Prior Publication Data
US 2016/0055416 A1    Feb. 25, 2016

(30) Foreign Application Priority Data
Aug. 21, 2014 (JP) .................. 2014-168585

(51) Int. Cl.
*G06N 5/02* (2006.01)
*G06N 20/00* (2019.01)
(Continued)

(52) U.S. Cl.
CPC ............. *G06N 20/00* (2019.01); *G06N 5/04* (2013.01); *G06N 7/005* (2013.01); *G06Q 30/00* (2013.01); *G06Q 30/0201* (2013.01); *G06N 5/02* (2013.01)

(58) Field of Classification Search
None
See application file for complete search history.

(56) References Cited

U.S. PATENT DOCUMENTS 8,326,792 B2   12/2012  Goraya
9,576,262 B2    2/2017  Ganguly et al.
(Continued)

FOREIGN PATENT DOCUMENTS

JP    2001022831 A    1/2001
JP    2001175761 A    6/2001
(Continued)

OTHER PUBLICATIONS

Chakrabartty, et al., Gini Support Vector Machine: Quadratic Entropy Based Robust Multi-Class Probability Regression, Journal of Machine Learning Research 8 (2007) 813-839.*
(Continued)

*Primary Examiner* — Wilbert L Starks
(74) *Attorney, Agent, or Firm* — Jared L. Montanaro

(57) ABSTRACT

An information processing apparatus includes a history acquisition section configured to acquire history data including a history indicating that a plurality of selection subjects have selected selection objects; a learning processing section configured to allow a choice model to learn a preference of each selection subject for a feature and an environmental dependence of selection of each selection object in each selection environment using the history data, where the choice model uses a feature value possessed by each selection object, the preference of each selection subject for the feature, and the environmental dependence indicative of ease of selection of each selection object in each of a plurality of selection environments to calculate a selectability with which each of the plurality of selection subjects selects each selection object; and an output section configured to output results of learning by the learning processing section.

8 Claims, 10 Drawing Sheets

(51) Int. Cl.
*G06N 5/04* (2006.01)
*G06N 7/00* (2006.01)
*G06Q 30/00* (2012.01)
*G06Q 30/02* (2012.01)

(56) References Cited

U.S. PATENT DOCUMENTS

| | | | |
|---|---|---|---|
| 2003/0063779 | A1 | 4/2003 | Wrigley |
| 2003/0112272 | A1 | 6/2003 | Gantenhammer |
| 2007/0124165 | A1 | 5/2007 | Eckel, Jr. |
| 2008/0306895 | A1 | 12/2008 | Karty |
| 2009/0006286 | A1 | 1/2009 | Angell et al. |
| 2009/0234710 | A1 | 9/2009 | Belgaied Hassine et al. |
| 2013/0151311 | A1 | 6/2013 | Smallwood et al. |
| 2013/0191241 | A1 | 7/2013 | Fillipi |
| 2013/0259379 | A1 | 10/2013 | Slaney et al. |
| 2014/0344013 | A1 | 11/2014 | Karty et al. |
| 2015/0051950 | A1 | 2/2015 | Cox et al. |
| 2016/0098648 | A1 | 4/2016 | Katsuki et al. |

FOREIGN PATENT DOCUMENTS

| | | | |
|---|---|---|---|
| JP | 2001319024 | A | 11/2001 |
| JP | 2002007659 | A | 1/2002 |
| JP | 2003016243 | A | 1/2003 |
| JP | 2005316756 | A | 11/2005 |
| JP | 2006085558 | A | 3/2006 |
| JP | 2007080059 | A | 3/2007 |
| JP | 2009223859 | A | 10/2009 |
| JP | 2009271873 | A | 11/2009 |
| JP | 2011065504 | A | 3/2011 |
| JP | 2013109470 | A | 6/2013 |
| JP | 2014048780 | A | 3/2014 |
| JP | 2014067206 | A | 4/2014 |

OTHER PUBLICATIONS

Chakrabartty, et al., Gini Support Vector Machine: Quadratic Entropy Based Robust Multi-Class Probability Regression, Journal of Machine Learning Research 8 (2007) 813-839 (Year: 2007).*

List of Ibm Patents or Patent Applictions Treated as Related; (Appendix P), Filed Feb. 1, 2016, 2 pages.

Takayuki Katsuki, et al., Pending U.S. Appl. No. 14/967,642 entitled "Predicting a Consumer Selection Preference Based on Estimated Preference and Environmental Dependence," filed with the USPTO on Dec. 14, 2015.

Katsuki et al., "Information Processing Apparatus, Information Processing Method, and Program," Japan Application No. 2014-168585, filed Aug. 21, 2014, (English translation), 63 pgs.

Notification of Reasons for Refusal, Japan Application No. 2014-168585, dated May 10, 2016, 2 pgs.

Written Argument, Japan Application No. 2014-168585, translated Oct. 19, 2016, 5 pgs.

Decision to Grant a Patent, Japan Application No. 2014-168585, dated Jun. 27, 2016, 3 pgs.

O. Chapelle, et al., "A Machine Learning Approach to Conjoint Analysis," Advances in Neural Information Processing Systems 17, 2005, pp. 1-8.

List of IBM Patents or Patent Applications Treated as Related, Sep. 7, 2017, 2 pgs.

Katsuki et al., "Predicting a Consumer Selection Preference Based on Estimated Preference and Environmental Dependence," U.S. Appl. No. 15/698,153, filed Sep. 7, 2017.

List of IBM Patents or Patent Applications Treated as Related, Mar. 25, 2019, 2 pgs.

Katsuki et al., "Predicting a Consumer Selection Preference Based on Estimated Preference and Environmental Dependence," U.S. Appl. No. 16/365,322, filed Mar. 26, 2019.

* cited by examiner

1: Initialize the values of $\mathbf{v}$, $\mathbf{w}$, $\mu_v$, $\Sigma_v$, $\mu_w$, and $\Sigma_w$
2: repeat
3: $\quad \mu_v \leftarrow \text{Normal}\left(\frac{\sum_n v^{(n)}}{|\mathcal{N}|}, \frac{\Sigma_v}{|\mathcal{N}|}\right)$
4: $\quad \Sigma_v \leftarrow \text{IW}\left(\frac{|\mathcal{L}|I + \sum_n (v^{(n)} - \bar{v})(v^{(n)} - \bar{v})^\top}{|\mathcal{L}| + |\mathcal{N}|}, |\mathcal{L}| + |\mathcal{N}|\right)$
5: $\quad \mu_w \leftarrow \text{Normal}\left(\frac{\sum_m w^{(m)}}{|\mathcal{M}|}, \frac{\Sigma_w}{|\mathcal{M}|}\right)$
6: $\quad \Sigma_w \leftarrow \text{IW}\left(\frac{|\mathcal{A}|I + \sum_m (w^{(m)} - \bar{w})(w^{(m)} - \bar{w})^\top}{|\mathcal{A}| + |\mathcal{M}|}, |\mathcal{A}| + |\mathcal{M}|\right)$
7: $\quad$ for all $n \in \mathcal{N}$ do
8: $\quad\quad \dot{v}^{(n)} \leftarrow \text{Normal}(v^{(n)}, \rho \Sigma_v)$
9: $\quad\quad$ Let $v^{(n)} := \dot{v}^{(n)}$ with probability $$\min\left\{\frac{\phi(\dot{v}^{(n)}|\mu_v, \Sigma_v) \prod_m p(k_n^{(m)}|\dot{v}^{(n)}, w^{(m)})}{\phi(v^{(n)}|\mu_v, \Sigma_v) \prod_m p(k_n^{(m)}|v^{(n)}, w^{(m)})}, 1\right\}$$

10: $\quad$ end for
11: $\quad$ for all $m \in \mathcal{M}$ do
12: $\quad\quad \dot{w}^{(m)} \leftarrow \text{Normal}(w^{(m)}, \rho \Sigma_w)$
13: $\quad\quad$ Let $w^{(m)} := \dot{w}^{(m)}$ with probability $$\min\left\{\frac{\phi(\dot{w}^{(m)}|\mu_w, \Sigma_w) \prod_n p(k_n^{(m)}|v^{(n)}, \dot{w}^{(m)})}{\phi(w^{(m)}|\mu_w, \Sigma_w) \prod_n p(k_n^{(m)}|v^{(n)}, w^{(m)})}, 1\right\}$$

14: $\quad$ end for
15: until A stopping condition is met.

FIG. 7

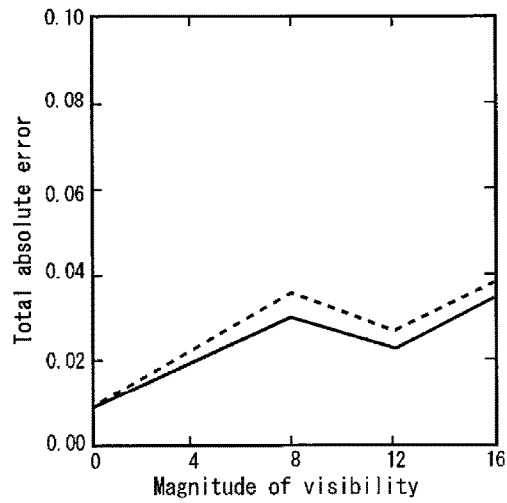
(a) $\beta = 0.5$, $\sigma^2 = 0.5\beta$
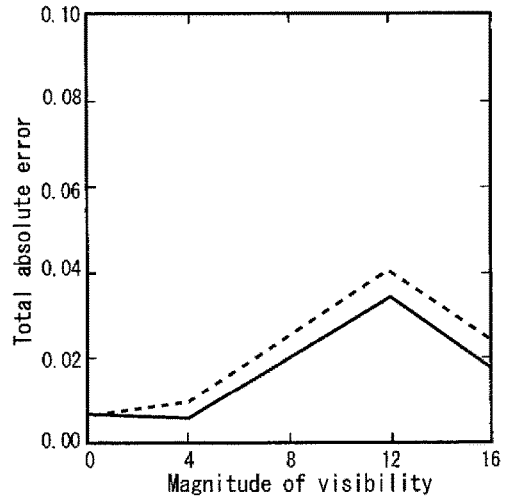
(b) $\beta = 0.5$, $\sigma^2 = 3.0\beta$
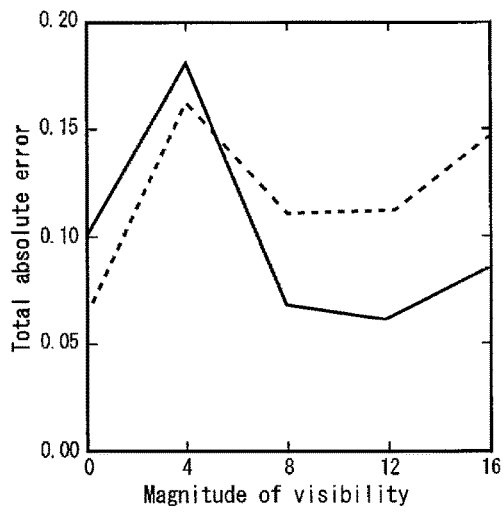
(c) $\beta = 3.0$, $\sigma^2 = 0.5\beta$
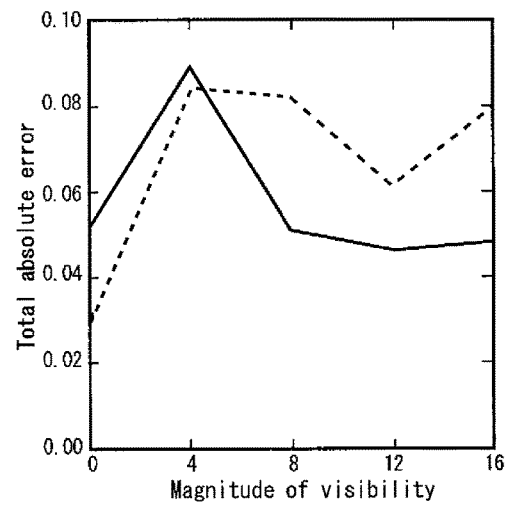
(d) $\beta = 3.0$, $\sigma^2 = 3.0\beta$
FIG. 8

PREDICTING A CONSUMER SELECTION PREFERENCE BASED ON ESTIMATED PREFERENCE AND ENVIRONMENTAL DEPENDENCE

FOREIGN PRIORITY

This application claims priority to Japanese Patent Application No. 2014-168585, filed Aug. 21, 2014, and all the benefits accruing therefrom under 35 U.S.C. § 119, the contents of which in its entirety are herein incorporated by reference.

BACKGROUND

The present invention relates to an information processing apparatus, an information processing method, and a program.

As a method for predicting what a selection subject (e.g., a consumer) selects from among multiple options (e.g., multiple commercial products), there is known conjoint analysis using a logit model as described in, for example, Japanese Patent Application Publication Nos. 2013-109470, 2005-316756, 2001-175761, 2011-65504, 2006-85558, and O. Chapelle and Z. Harchaoui, "A Machine Learning Approach to Conjoint Analysis," Advances in Neural Information Processing Systems 17, L. K. Saul, Y. Weiss, and L. Bottou, Eds., 2005, pp. 257-264. In this method, the features of options are vectorized to perform a logistic regression analysis of the preference vector of a targeted person on the features of options and an actually selected option in order to build a prediction model for estimating a preference of the selection subject to predict a selection object that the selection subject will select in the future.

Here, since the conjoint analysis using a conventional logit model is based on the premise of a situation in which an option matching a preference is selected from among options recognized by a selection subject, the options recognized by the selection subject need to be specified explicitly in learning data. However, in normal learning data such as purchase data, only a commercial product selected by a consumer is recorded without recording with which commercial product the consumer has compared the commercial product to select the commercial product, and this cannot lead to the prediction of a selection object after considering the options recognized by the selection subject.

Further, the consideration of the options by the selection subject may be influenced by an environment at the time of selection, such as the cognitive bias and/or a point-of-sale situation, as well as the features of and preferences to the options. However, in the conjoint analysis using the conventional logit model, such an influence of the environment at the time of selection is not considered, and this makes it difficult to estimate a precise preference of the selection subject by excluding the influence of the environment.

SUMMARY

In one aspect, an information processing apparatus includes a history acquisition section configured to acquire history data including a history indicating that a plurality of selection subjects have selected selection objects; a learning processing section configured to allow a choice model to learn a preference of each selection subject for a feature and an environmental dependence of selection of each selection object in each selection environment using the history data, where the choice model uses a feature value possessed by each selection object, the preference of each selection subject for the feature, and the environmental dependence indicative of ease of selection of each selection object in each of a plurality of selection environments to calculate a selectability with which each of the plurality of selection subjects selects each selection object; and an output section configured to output results of learning by the learning processing section.

In another aspect, an information processing method executed by a computer includes acquiring a feature value for a feature possessed by each of a plurality of selection objects; acquiring history data including a history indicating that a plurality of selection subjects have selected selection objects; learning processing by allowing a choice model to learn a preference of each selection subject for a feature and an environmental dependence of selection of each selection object in each selection environment using the history data, where the choice model uses a feature value for each selection object, the preference of each selection subject for the feature, and the environmental dependence indicative of ease of selection of each selection object in each of a plurality of selection environments to calculate a selectability with which each of the plurality of selection subjects selects each selection object; and outputting learning results obtained in the learning processing.

In another aspect, a nontransitory, computer readable storage medium having computer readable instructions stored thereon that, when executed by a computer, implement a method, including acquiring a feature value for a feature possessed by each of a plurality of selection objects; acquiring history data including a history indicating that a plurality of selection subjects have selected selection objects; learning processing by allowing a choice model to learn a preference of each selection subject for a feature and an environmental dependence of selection of each selection object in each selection environment using the history data, where the choice model uses a feature value for each selection object, the preference of each selection subject for the feature, and the environmental dependence indicative of ease of selection of each selection object in each of a plurality of selection environments to calculate a selectability with which each of the plurality of selection subjects selects each selection object; and outputting learning results obtained in the learning processing.

BRIEF DESCRIPTION OF THE DRAWINGS

FIG. 7 shows an example of a specific learning algorithm of the embodiment.

FIG. 8 shows an example of the effects of the information processing apparatus of the embodiment.

DETAILED DESCRIPTION

In view of the above, embodiments of the present invention solve the problems in the conjoint analysis using the conventional logit model.

In a first aspect of the present invention, there are provided an information processing apparatus, an information processing method using the apparatus, and a program used in the apparatus. The information processing apparatus includes: a history acquisition section for acquiring history data including a history indicating that multiple selection subjects have selected selection objects; a learning processing section for allowing a choice model to learn a preference of each selection subject for the features and an environmental dependence of the selection of each selection object in each selection environment using the history data, where the choice model uses a feature value possessed by each selection object, the preference of each selection subject for features, and the environmental dependence indicative of ease of selection of each selection object in each of multiple selection environments to calculate a selectability with which each of multiple selection subjects selects each selection object; and an output section for outputting the results of learning by the learning processing section.

It should be noted that the above summary of the invention does not recite all features of the present invention, and sub combinations of these feature groups can also be inventions.

While the present invention will be described below with reference to an embodiment, the following embodiment is not intended to limit the inventions according to the appended claims, and all the combinations of the features described in the embodiment are not necessarily essential to the means for solving the problems in the present invention.

Figure 1:
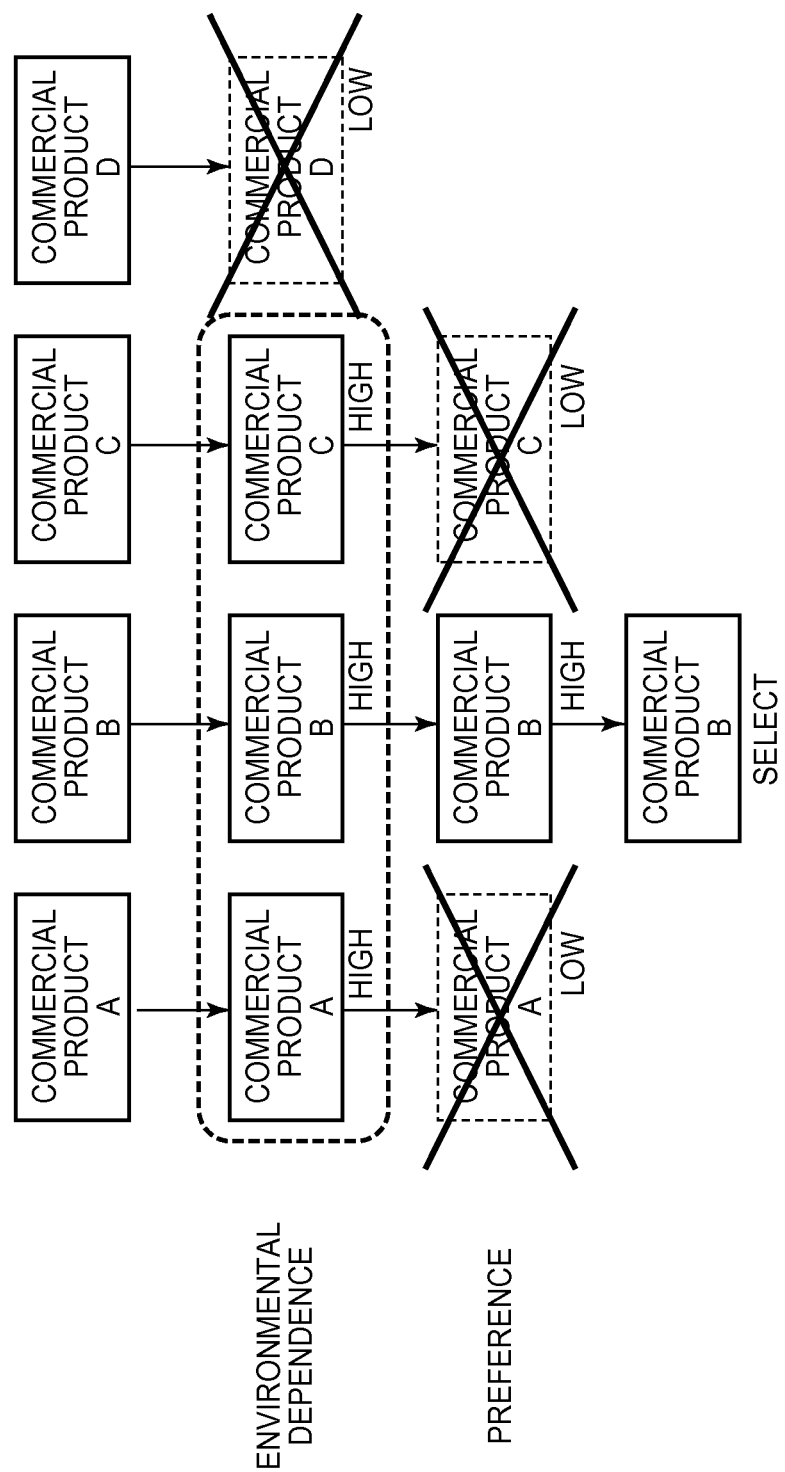
FIG. 1 shows an example of a choice model built by an information processing apparatus of an embodiment.

FIG. 1 shows an example of a choice model built by an information processing apparatus 10 of the embodiment. Here, description will be made by taking, as an example, a case where a consumer as a selection subject selects one from among commercial product A, commercial product B, commercial product C, and commercial product D as selection objects. The consumer selects one commercial product based on the environmental dependence and the preference of the consumer for each commercial product.

The environmental dependence indicates the ease of selection of each selection object in each of selection environments, respectively, resulting from the form of presentation of the selection object to the selection subject in the selection environment and/or the cognitive biases of the selection subject (such as decoy effect, anchoring effect, and confirmation bias), i.e., a parameter that bears no immediate relationship to the features of the selection object itself. In the example of FIG. 1, the consumer recognizes, as options, the commercial product A, the commercial product B, and the commercial product C, which are high in environmental dependence, from among the commercial product A, the commercial product B, the commercial product C, and the commercial product D, and among them, the consumer eventually purchases the commercial product B high in the degree of matching with the preference of the consumer.

Figure 2:
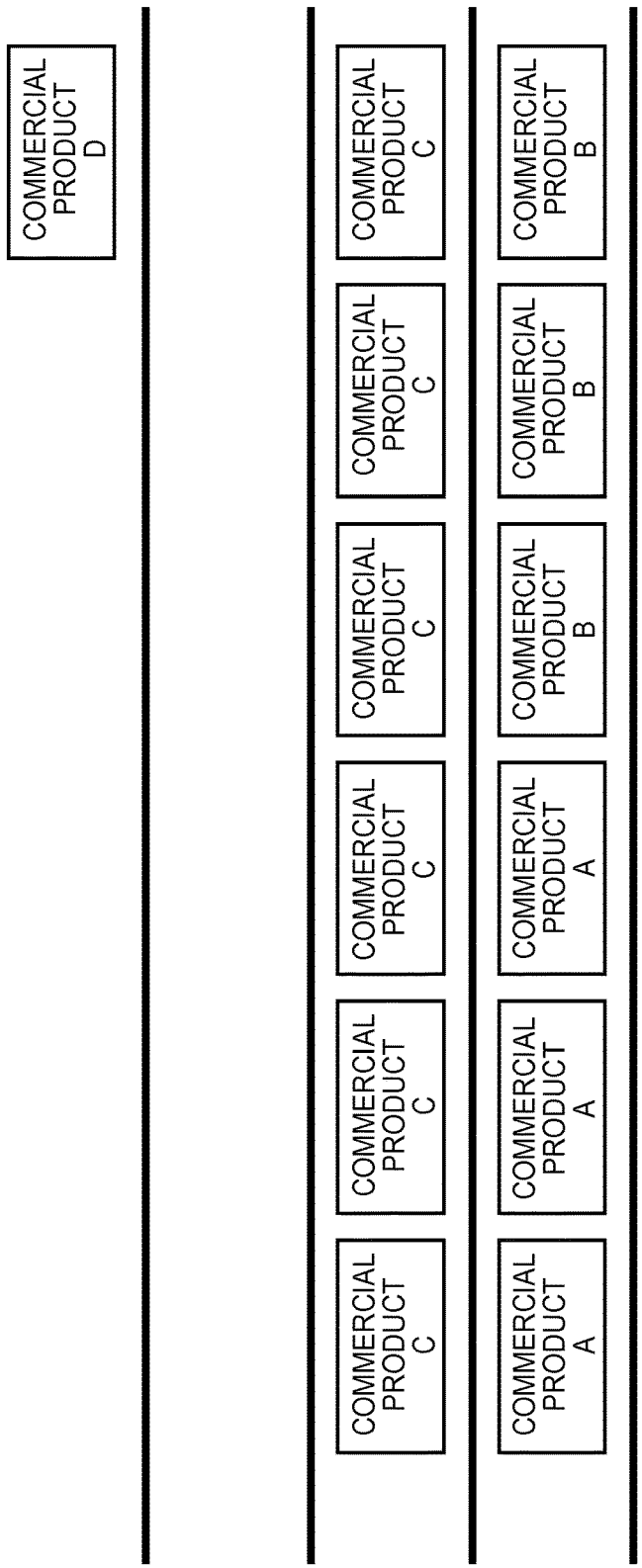
FIG. 2 shows an example of a display of commercial products in the choice model of FIG. 1.

FIG. 2 shows an example of a display of commercial products in the choice model of FIG. 1. For example, when the commercial product D is displayed inconspicuously compared with the other commercial products A to C, the consumer may recognize only the commercial products A to C as options among the commercial products A to D. As an example, as shown in FIG. 2, when the commercial product D is displayed at the end of a shelf separately and away from the other commercial products while many of the other commercial products A to C are displayed all over the shelves, the consumer may not recognize the commercial product D as an option because of being less exposed than the other commercial products. In such a case, the environmental dependence of the commercial product D in the selection environment becomes low.

The information processing apparatus 10 of the embodiment incorporates a factor, which pertains to the environment at the time of selection and is not directly dependent on such features of the selection object, into the choice model as an environmental dependence. Here, when the unit of opportunity for the selection subject to select one selection object is called a selection opportunity, the information processing apparatus 10 sets an environmental dependence for each selection opportunity on the assumption that an independent selection environment exists at each selection opportunity.

Figure 3:
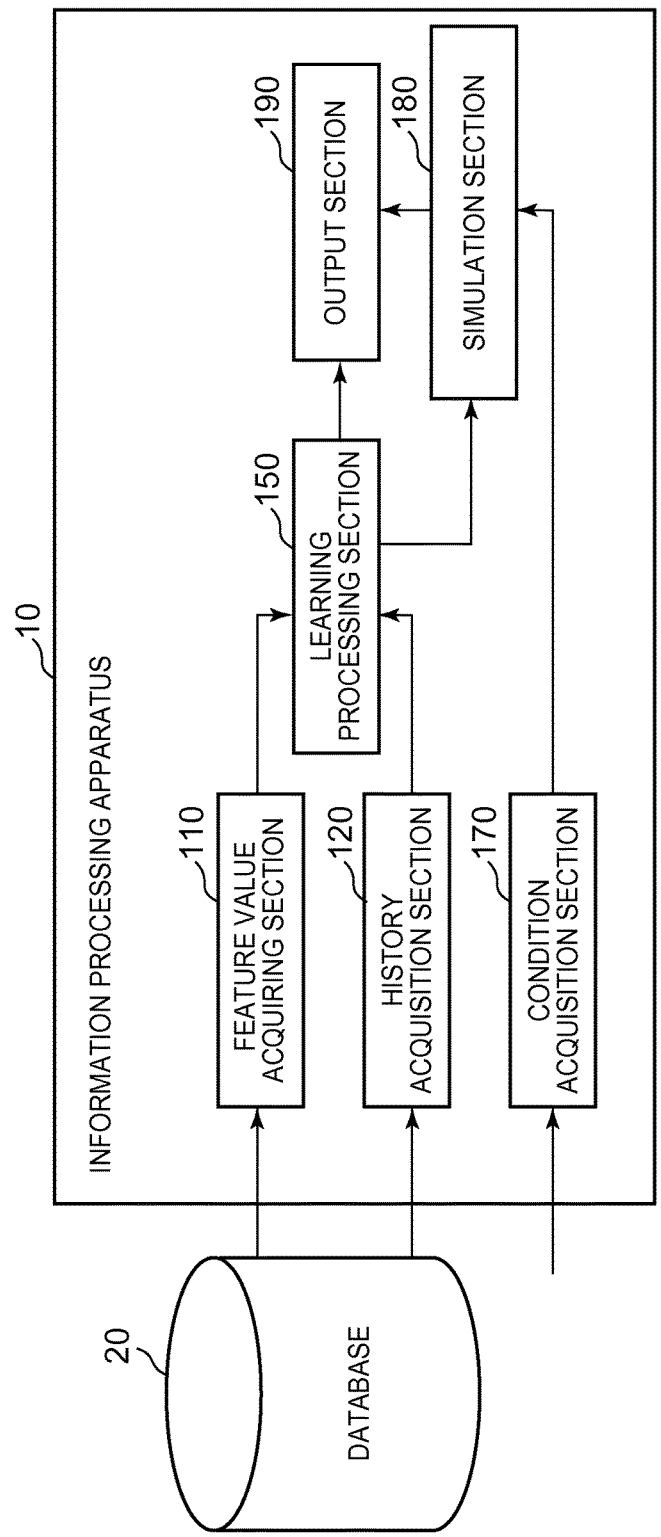
FIG. 3 shows a block diagram of the information processing apparatus of the embodiment.

FIG. 3 shows a block diagram of the information processing apparatus 10 according to the embodiment. The information processing apparatus 10 generates a choice model for estimating a preference for a feature of the selection object and an environmental dependence on the selection environment from a history indicating that the selection subject has selected the selection object to simulate future choice of the selection object based on the choice model. The information processing apparatus 10 includes a feature value acquiring section 110, a history acquisition section 120, a learning processing section 150, a condition acquisition section 170, a simulation section 180, and an output section 190.

The feature value acquiring section 110 acquires feature data including a feature value for a feature possessed by each of multiple selection objects. For example, when the selection objects are commercial products, the feature value acquiring section 110 acquires, from an external or internal database 20 of the information processing apparatus 10, a feature vector having, as respective elements, multiple feature values corresponding to multiple features (such as size, color, and price) of a commercial product. The feature value acquiring section 110 provides the acquired feature data to the learning processing section 150.

The history acquisition section 120 acquires history data including a history, indicating that the selection subject has selected the selection object, from the external or internal database 20 of the information processing apparatus 10. For example, when the selection object is a commercial product, the history acquisition section 120 acquires a purchase history including records of the commercial product purchased by multiple consumers. The history acquisition section 120 provides the acquired history data to the learning processing section 150.

The learning processing section 150 allows a choice model to learn a preference of each selection subject for features and an environmental dependence of the selection of each selection object in a selection environment for each selection opportunity using the history data, where the choice model uses one or more feature values respectively corresponding to one or more features of each selection object possessed by each selection object, the preference of each selection subject for the features, and the environmental dependence of each selection object in each of multiple selection environments to calculate a selectability with which each of multiple selection subjects selects each selection object. For example, the learning processing section 150 allows a learning model to learn the preference for each selection object and the environmental dependence for each selection opportunity by Bayesian estimation. The learning processing section 150 provides the learning results to the simulation section 180 and the output section 190.

The condition acquisition section 170 acquires, from a user of the information processing apparatus 10, simulation conditions necessary to perform simulation of a choice model. For example, when a choice model in which a consumer selects and purchases a commercial product is simulated, the condition acquisition section 170 acquires feature data on the commercial product as a selection object of the consumer. The condition acquisition section 170 provides the acquired simulation conditions to the simulation section 180.

Based on the preference and the environmental dependence obtained as a result of learning by the learning processing section 150, and the simulation conditions acquired from the condition acquisition section 170, the simulation section 180 performs a simulation based on the choice model in which the selection subject selects the selection object. For example, the simulation section 180 performs a simulation of how the consumer having a predetermined preference selects the commercial product. The simulation section 180 provides simulation result data to the output section 190.

The output section 190 outputs the learning results by the learning processing section 150 and/or the simulation results by the simulation section 180. For example, the output section 190 may display, on a display of the information processing apparatus 10, the preference and the environmental dependence obtained by learning and/or the simulation results, the result of the commercial product purchased by the consumer, and the like.

Thus, based not only on the preference for the selection object but also on the environmental dependence on the selection environment, the information processing apparatus 10 builds a choice model for a selection subject to make a selection. This enables the information processing apparatus 10 to consider, in the choice model, the environment in which the selection was made and the influence of an element that bears no immediate relationship to the features of the selection object such as cognitive bias in order to make a more precise estimate of the preference of the selection subject for the selection object. Further, the information processing apparatus 10 can simulate a state of the selection subject to make a selection more precisely based on the estimated preference and environmental dependence.

Figure 4:
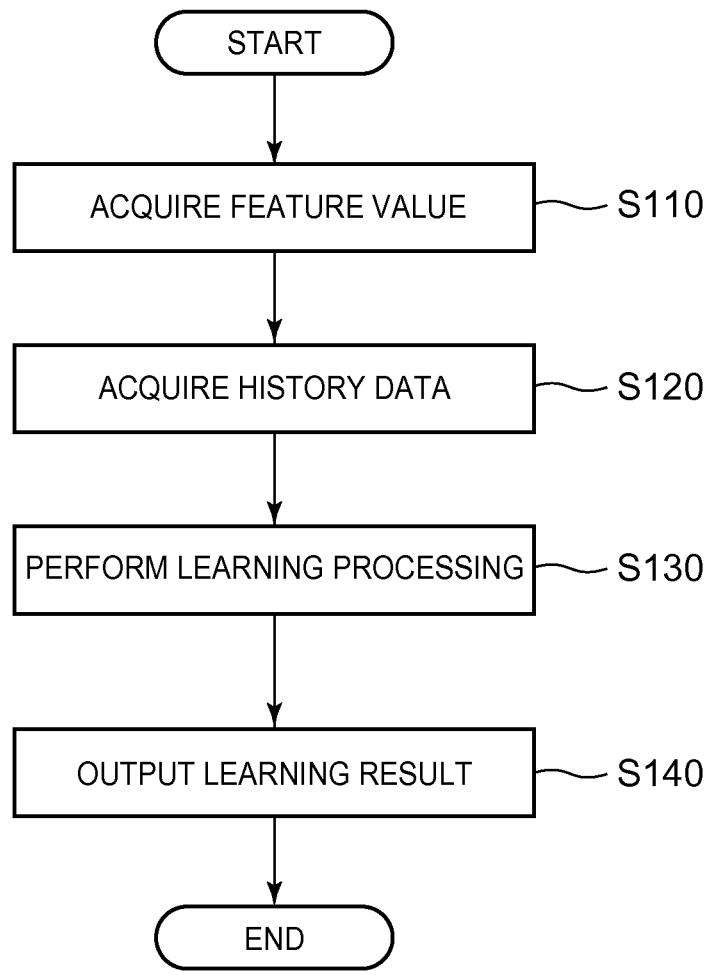
FIG. 4 shows a flow of learning processing performed by the information processing apparatus of the embodiment.

FIG. 4 shows a flow of learning processing by the information processing apparatus 10 of the embodiment. In the embodiment, a choice model when an individual consumer selects a commercial product will be mainly described, but the application of the information processing apparatus 10 is not limited thereto. For example, the information processing apparatus 10 models, as a choice model, a state in which a selection subject(s) capable of making a decision, such as an individual, an organization, a robot and/or an animal, to select a commercial product, a service, an object of an action, and/or an object of acquisition as a selection object(s).

In the embodiment, the information processing apparatus 10 performs processing from S110 to S140 to build a choice model.

First, in S110, the feature value acquiring section 110 acquires, as feature data, a feature vector $u^{(k|k \in K)}$ indicative of multiple feature values corresponding to multiple features of each of K selection objects (where K is an integer of two or more). For example, for each commercial product k as a selection object, the feature value acquiring section 110 acquires, from the database 20, feature data including a feature vector $u^{(k)}$ having, as respective elements, feature values obtained by quantifying the features of the commercial product (as an example, size, color, price, performance, manufacturer, and type). The feature value acquiring section 110 provides the acquired feature data to the learning processing section 150.

Next, in S120, the history acquisition section 120 acquires history data including a history indicating that one or two or more selection subjects has selected a selection object in each of multiple selection environments corresponding to multiple selection opportunities. For example, the history acquisition section 120 acquires, as a history, that the m-th (m∈M) selection subject selected the $k_n^m$-th election object at the n-th (n∈N) selection opportunity.

The selection opportunity may be common to the multiple selection subjects. When the selection of commercial products is taken for example, the history acquisition section 120 may acquire, as a history of the first selection opportunity (n=1), a purchase history including a commercial product $k_1^1$ purchased by the first consumer in a department A of a department store ZZ in the first week of XX month, a commercial product $k_1^2$ purchased by the second consumer in the same department of the same store during the same period, . . . , a commercial product $k_1^M$ purchased by the M-th consumer in the same department of the same store on the same day. Thus, when the learning processing section 150 estimates an environmental dependence on each selection environment corresponding to each selection opportunity later, an environmental dependence common to multiple selection subjects can be obtained.

Note that, when one selection subject selects multiple selection objects at the same time, each of the multiple selection objects may be set to be at one purchase opportunity, respectively. For example, when the first consumer purchased two commercial products at the department store ZZ in the first week of XX month, the history acquisition section 120 may acquire, as a history, two pieces of data corresponding to two commercial products as a commercial product $k_1^1$.

Instead of this, when one selection subject selects multiple selection objects at the same time, the multiple selection objects may be set to be at different purchase opportunities, respectively. For example, when the first consumer purchased two commercial products at the department store ZZ in the first week of XX month, the history acquisition section 120 may acquire, as a history, a commercial product $k_1^1$ and a commercial product $k_2^1$. The history acquisition section 120 provides the acquired history data to the learning processing section 150.

Next, in S130, the learning processing section 150 builds a choice model for calculating a selectability, with which each of multiple selection subjects selects each selection object, using the feature values of each selection object, the preference of each selection subject, and the environmental dependence, and allows the choice model to learn the preference of each selection subject for the features and the environmental dependence of each selection object in each selection environment using the feature data and the history data.

For example, the learning processing section 150 allows the choice model to learn a preference vector $w^{(m)}$ including, as each element, a preference of each selection subject m for each of the multiple features, and an environmental dependence of each selection object common to the multiple selection subjects in each selection environment corresponding to each selection opportunity n. The learning processing section 150 may allow the choice model to learn a feature vector $u^{(k)}$ of each selection object k in addition to the preference vector and the environmental dependence based on the learning data without taking the feature vector as given.

In learning the environmental dependence, the learning processing section 150 may learn an environment-dependent vector $v^{(n)}$ including, as an element, an environmental dependence $v_{n,k}$ of the selection of each selection object k in a selection environment at a selection opportunity n. Thus, the learning processing section 150 estimates the ease of selection of each selection object in a selection environment provided at each selection opportunity.

The learning processing section 150 may also learn an environmental dependence $v_{n,k}$ common to all the selection subjects. Instead of this, the learning processing section 150 may learn an environmental dependence $v_{n,k}$ common to each group of selection subjects. For example, the learning processing section 150 may learn an environmental dependence $v_{n,k}$ common to each group of multiple selection subjects sharing attributes. As an example, the learning processing section 150 may learn the environmental dependence $v_{n,k}$ for each group of multiple selection subjects grouped by gender, age group, address, and/or occupation. Thus, for example, when a commercial product k' is displayed to make it easy for men to recognize it as a purchase option but not easy for women to recognize it as a purchase option in a department corresponding to a selection opportunity n', the learning processing section 150 can increase the value of an environmental dependence $v^{m1}_{n',k'}$ for men and decrease the value of an environmental dependence $v^{fm}_{n',k'}$ for women to model a cognitive gender difference.

The learning processing section 150 may learn a logit model in which an environmental dependence of each selection object is added to the degree of matching between the features of the selection object and the preference of each selection subject. Specifically, as shown in Equation 1 below, the learning processing section 150 learns a choice model for calculating a selectability $p(k|w^{(m)}, v^{(n)})$, with which each selection subject m selects each selection object k in each selection environment provided at a selection opportunity n, based on the product of a feature of vector $u^{(k)}$ or the selection object and a preference vector $w^{(m)}$ of the selection subject, and an element $v_{n,k}$ corresponding to the selection object k in an environment-dependent vector $v^{(n)}$ corresponding to the selection environment.

$$p(k \mid w^{(m)}, v^{(n)}) \equiv \frac{\exp(w^{(m)T}u^{(k)} + v_{n,k})}{\sum_{\ell \in L} \exp(w^{(m)T}u^{(\ell)} + v_{n,\ell})} \quad \text{Eq. 1}$$

In this learning processing, the learning processing section 150 may calculate a posterior probability distribution of the preference of each selection subject for the features and a posterior probability distribution of the environmental dependence of the selection of each selection object in each selection environment. For example, the learning processing section 150 may perform a Bayesian estimation based on a Markov chain Monte Carlo method (MCMC) such as Gibbs sampling or a Metropolis-Hastings method to calculate the posterior probability distributions of the preference and the environmental dependence. Instead of this, the learning processing section 150 may use a maximum a posteriori probability (MAP) estimation or maximum-likelihood method to estimate the value of the preference of each selection subject for a feature and the value of the environmental dependence in each selection environment. A specific algorithm for learning by the learning processing section 150 will be described later.

The learning processing section 150 provides the learning results to the output section 190. For example, the learning processing section 150 provides, to the simulation section 180 and/or the output section 190, the preference value and the value of the environmental dependence obtained as a result of learning, or these posterior probability distributions. As an example, the learning processing section 150 may provide, to the simulation section 180 and/or the output section 190, learning results including sampled values based on the posterior probability distributions and/or the mean/variance/median of the posterior probability distributions.

Next, in S140, the output section 190 may display, on the display of the information processing apparatus 10, the posterior probability distributions of the preference and the environmental dependence included in the learning results.

Figure 5:
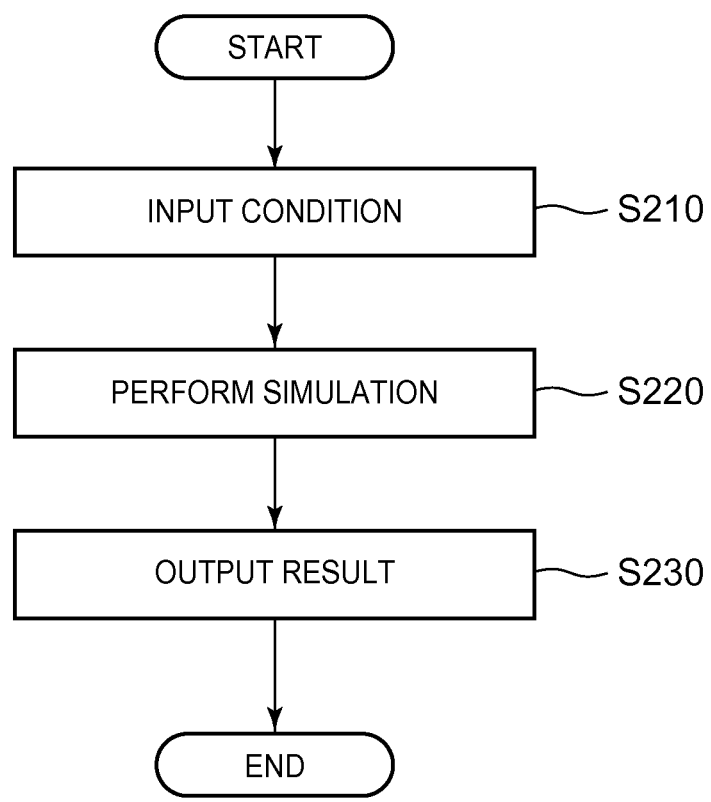
FIG. 5 shows a flow of simulation performed by the information processing apparatus of the embodiment.

FIG. 5 shows a flow of simulation by the information processing apparatus 10 of the embodiment. In the embodiment, the information processing apparatus 10 performs processing S210 to S230 to perform simulation based on a choice model.

First, in S210, the condition acquisition section 170 acquires, from the user of the information processing apparatus 10, simulation conditions necessary to perform the simulation of a choice model. For example, the condition acquisition section 170 acquires feature data including a feature vector $u^{(k)}$ for multiple selection objects. As an example, when a choice model for a consumer to select and purchase a commercial product is simulated, the condition acquisition section 170 acquires feature data including the feature vector $u^{(k)}$ of all commercial products as purchase objects of the consumer.

The condition acquisition section 170 may also acquire selection environment information on a selection environment in which the selection is made. For example, when a choice model for a consumer selects and purchases a commercial product is simulated, the condition acquisition section 170 acquires, as the selection environment information, information on the sales period of the commercial product, the sales spot of the commercial product and/or a display method of the commercial product, and the like. The condition acquisition section 170 provides the acquired simulation conditions to the simulation section 180.

Next, in S220, the simulation section 180 performs a simulation based on the results of learning by the learning processing section 150. For example, the simulation section 180 uses the feature vector $u^{(k)}$ acquired from the condition acquisition section 170, and the preference vector $w^{(m)}$ of the selection subject and the environment-dependent vector $v^{(n)}$ corresponding to the selection environment acquired from the learning processing section 150 to simulate a choice model for the selection subject m to select the selection object k at the selection opportunity n with the selectability $p(k|w^{(m)}, v^{(n)})$ based on Equation 1.

Here, the simulation section 180 may set the environment-dependent vector $v^{(n)}$ based on the selection environment information. For example, a selection opportunity n=1 is assigned to a selection environment for causing the selection subject (consumer) to select a commercial product in the department A of the department store ZZ in the first week of XX month, and a selection opportunity n=2 is assigned to a selection environment for causing the selection subject to select the commercial product in a department B of the department store ZZ in the first week of XX month. In this case, the simulation section 180 may assign $v^{(1)}$ as an environment-dependent vector corresponding to the selection environment for causing the selection of the commercial product in the department A of the department store ZZ in the first week of XX month, and $v^{(2)}$ as an environment-dependent vector corresponding to the selection environment for causing the selection of the commercial product in the department B of the same store during the same period. This enables the simulation section 180 to simulate a state in which the selection is made in the same environment as the environment in which the selection was made in the past (e.g., the environment of a specific department during a specific period).

Further, when the preference vector $w^{(m)}$ and the environment-dependent vector $v^{(n)}$ are given as the probability distributions from the learning processing section 150, the simulation section 180 may use sample values, mean values, median values, or the like from the probability distributions as the preference vector $w^{(m)}$ and the environment-dependent vector $v^{(n)}$.

The simulation section 180 provides the results of performing the simulation to the output section 190. For example, the simulation section 180 provides, to the output section 190, simulated results data including a selection object selected by each selection subject at each selection opportunity.

Next, in S230, the output section 190 displays the simulated results data. For example, the output section 190 may display, on the display of the information processing apparatus 10, a histogram or the like of the selection object selected as a result of the simulation.

Thus, the information processing apparatus 10 builds a choice model including the environmental dependence on the environment in which the selection was made and solves this by the Bayesian estimation or the like. This enables the information processing apparatus 10 to make a more precise estimate of the preference of each selection subject for a selection object in consideration of the influence of an element that bears no immediate relationship to the environment in which the selection object is placed and the features of the selection object, such as the cognitive bias of the selection subject. Thus, for example, the information processing apparatus 10 can simulate an environment in which a consumer selects and purchase a commercial product more precisely according to the preference and the environment.

Figure 6:
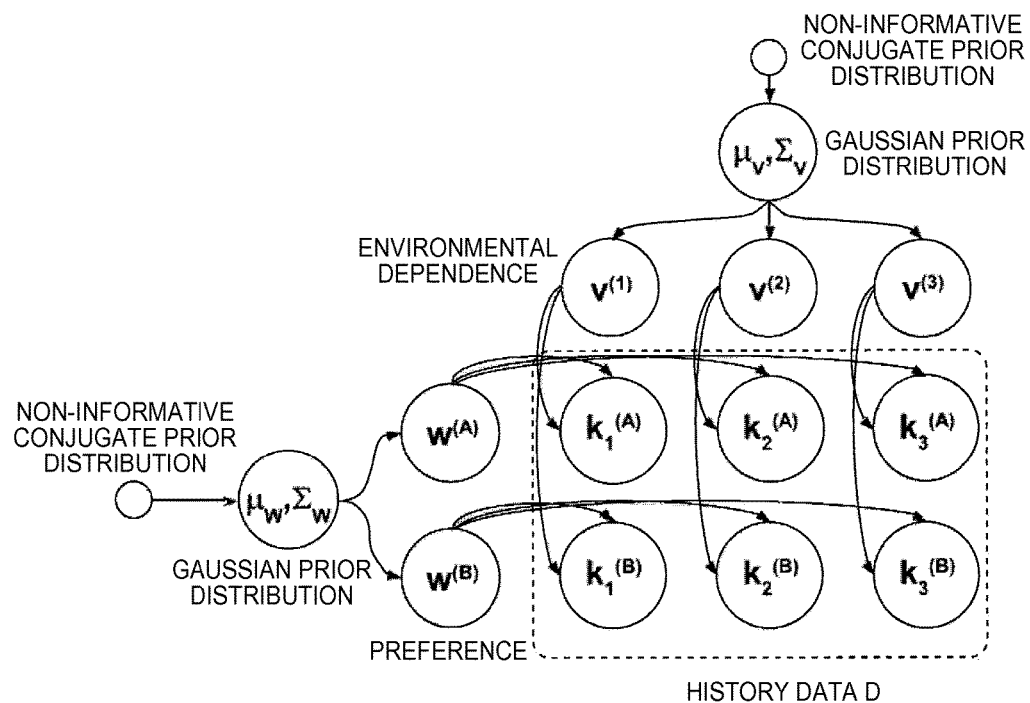
FIG. 6 shows an outline of a hierarchical Bayesian model used in learning processing of the embodiment.

Referring here to FIG. 6 and FIG. 7, a specific example of learning processing in S130 of FIG. 4 will be described. For example, the learning processing section 150 estimates the parameters of a hierarchical Bayesian model for generating posterior probability distributions of the preference of a selection subject and the environmental dependence on a selection environment.

FIG. 6 shows an outline of the hierarchical Bayesian model used in learning processing by the learning processing section 150 of the embodiment. As shown, the learning processing section 150 samples, for environment-dependent vectors $v^{(n)}$, mean $\mu_v$ and variance $\Sigma_v$ as hyper-parameters from a non-informative conjugate prior distribution to generate the environment-dependent vectors $v^{(n)}$ from the samples having the mean $\mu_v$ and the variance $\Sigma_v$ according to a Gaussian prior distribution. For n∈N, the environment-dependent vectors $v^{(n)}$ are independent and identically distributed (i.i.d.).

Further, the learning processing section 150 samples, for preference vectors $w^{(m)}$, $\mu_w$ and $\Sigma_w$ values as hyper-parameters from the non-informative conjugate prior distribution to generate the preference vectors $w^{(m)}$ according to a Gaussian prior distribution having the sampled μw and Σw values as mean $\mu_w$ and variance $\Sigma_w$. For m∈M, the preference vectors $w^{(m)}$ are independent and identically distributed (i.i.d.).

Here, the learning processing section 150 learns the Gaussian prior distribution of the environment-dependent vectors $v^{(n)}$ and the Gaussian prior distribution of the preference vectors $w^{(m)}$ so that history data D including selection objects $k_1^{(A)}$ to $k_3^{(A)}$, $k_{1(B)}$ to $k_3^{(B)}$ . . . selected by each selection subject (A, B . . . ) at each selection opportunity (1, 2, 3 . . . ) will match the choice model. Using the Gaussian prior distributions, the learning processing section 150 can improve calculation efficiency and guarantee favorable robustness.

FIG. 7 shows a specific example of a learning algorithm using the hierarchical Bayesian model executed by the learning processing section 150 of the embodiment. The learning processing section 150 may execute processes on the first to 15th lines of FIG. 7 to perform learning processing related to S130 in FIG. 4.

Note that in the figure, $\Sigma_m$ indicates $\Sigma_{m \in M}$, $\Sigma_n$ indicates $\Sigma_{n \in N}$, $\Pi_m$ indicates $\Pi_{m \in M}$, $\Pi_n$ indicates $\Pi_{n \in N}$, w bar (a bar over w in the figure, which is referred to as $w_{tot}$ here) indicates $\Sigma_m w^{(m)}/M$, v bar (a bar over v in the figure, which is referred to as $v_{tot}$ here) indicates $\Sigma_n v^{(n)}/N$, and $\varphi(\Pi \cdot | \mu, \Sigma)$ indicates the probability density function of a multidimensional normal distribution (μ, Σ), where the mean is μ and the covariance is Σ.

First, the learning processing section 150 initializes v, w, $\mu_v$, $\Sigma_v$, $\mu_w$, and $\Sigma_w$ in the first line. For example, the learning processing section 150 may assign a predetermined initial value (e.g., 0) and/or a random value to each element of the environment-dependent vector $v^{(n)}$ and the preference vector $w^{(m)}$. Further, the learning processing section 150 may assign predetermined values (for example, $\mu_v=0$, $\mu_w=0$, $\Sigma_v=1$, and $\Sigma_w=1$) to $\mu_v$, Σv, $\mu_w$, and $\Sigma_w$.

Next, the learning processing section 150 executes processes of a first loop in the second to 15th lines. The learning processing section 150 repeats the processes of the first loop until a predetermined condition is met. As the predetermined condition for finishing the first-loop processing, the learning processing section 150 may use the fact that the loop processing is repeated predetermined number of times or the fact that the probability distributions of $v^{(n)}$ and $w^{(m)}$ to be output become a steady state.

On the third line in the first loop, the learning processing section 150 samples $\mu_v$ from a multidimensional normal distribution, where the mean is $\Sigma_n v^{(n)}/|N|$ and the covariance is $\Sigma_v/|N|$, as a non-informative conjugate prior distribution.

Next, on the fourth line, the learning processing section 150 samples $\Sigma_v$ from an inverse Wishart distribution, where the scale is $\{|L|I+\Sigma_n(v^{(n)}-v_{tot})(v^{(n)}-v_{tot})^T\}/(|L|+|N|)$ and the degree of freedom is |L|+|N|, as a non-informative conjugate prior distribution. Here, L denotes a set of selection objects and I denotes an identify matrix.

Next, on the fifth line, the learning processing section 150 samples $\mu_w$ from a multidimensional normal distribution, where the mean is $\Sigma_m w^{(m)}/|M|$ and the covariance is $\Sigma_w/|M|$, as a non-informative conjugate prior distribution.

Next, on the sixth line, the learning processing section 150 samples $\Sigma_v$ from an inverse Wishart distribution, where the scale is $\{|A|I+\Sigma_m(w^{(m)}-w_{tot})(w^{(m)}-w_{tot})^T\}/(|A|+|M|)$ and the degree of freedom is |A|+|M|, as a non-informative conjugate prior distribution. Here, A denotes a set of elements of the preference vector and I denotes an identify matrix.

Thus, on the third to sixth lines, the learning processing section 150 generates distribution parameters ($\mu_v$, $\Sigma_v$, $\mu_w$, and $\Sigma^w$) of the prior distributions of a preference vector of each selection subject and an environment-dependent vector in each selection environment.

Next, on the seventh to tenth lines, the learning processing section 150 executes second-loop processes in the first loop. The learning processing section 150 samples $v^{(n)}$ forming a posterior probability distribution on $n \in N$ by completing the second-loop processing.

First, on the eighth line in the second loop, the learning processing section 150 generates sample candidates $v\bullet^{(n)}$ for the environment-dependent vector in each selection environment from a distribution based on the distribution parameter $\Sigma_v$ of the prior distribution of the environment-dependent vector and the sample $v^{(n)}$ of the environment-dependent vector obtained in the previous first loop. For example, the learning processing section 150 samples $v\bullet^{(n)}$ (a dot above v in the figure) from a multidimensional normal distribution Normal ($v^{(n)}$, $\rho\Sigma_v$), where the mean is $v^{(n)}$ and the covariance is $\rho\Sigma_v$. In the initial firstloop processing, the initial value defined on the first line is given to $v^{(n)}$, and a value obtained in the previous first-loop processing is given to $v^{(n)}$ in the second round of the first-loop processing and beyond. Note that $\rho$ is a predetermined parameter before the learning processing, which is 0.23, for example.

Next, on the ninth line, the learning processing section 150 determines, for each of the sample candidates $v\bullet^{(n)}$ for the environment-dependent vector, whether the sample candidate $v\bullet^{(n)}$ is selected as the next sample of the environment-dependent vector, based on an occurrence probability of the sample candidate $v\bullet^{(n)}$ for the prior distribution, and the likelihood of the sample candidate $v\bullet^{(n)}$ for selection in history data and the environment-dependent vector of each selection subject.

Specifically, the learning processing section 150 calculates a divided value obtained by dividing the product of a probability density $\varphi(v\bullet^{(n)}|\mu_v, \Sigma_v)$ of the occurrence of $v\bullet(n)$ from the multidimensional normal distribution where the mean is $\mu_v$ and the covariance is $\Sigma_v$ (that is, an occurrence probability density of $v\bullet^{(n)}$ in the prior probability distribution) and an infinite product $\Pi_m(k_n^{(m)}|v\bullet^{(n)}, w^{(m)})$ of $m \in M$ of the probability of selection of $k_n^{(m)}$ indicated by the history data when $v\bullet^{(n)}$ and $w^{(m)}$ are set as conditions (that is, the likelihood of $v\bullet^{(n)}$) by the product of a probability density $\varphi(v^{(n)}|\mu_v, \Sigma_v)$ of the occurrence of $v^{(n)}$ from the multidimensional normal distribution where the mean is $\mu_v$ and the covariance is $\Sigma_v$ (that is, an occurrence probability density of $v^{(n)}$ in the prior probability distribution) and an infinite product $\Pi_m(k_n^{(m)}|v^{(n)}, w^{(m)})$ of $m \in M$ of the probability of selection of $k_n^{(m)}$ indicated by the history data when $v^{(n)}$ and $w^{(m)}$ are set as conditions (that is, the likelihood of $v^{(n)}$). Then, the learning processing section 150 adopts, as new sample $v^{(n)}$, $v\bullet^{(n)}$ sampled with a lower probability between the divided value and 1.

Thus, the learning processing section 150 performs the second-loop processing on the eighth and ninth lines to sample a candidate $v\bullet^{(n)}$ for the next sample from the multidimensional normal distribution based on the environment-dependent vector $v^{(n)}$ in each selection environment obtained as a result of the previous first-loop processing, and adopt the $v\bullet^{(n)}$ based on the prior distribution of the environment-dependent vector $v^{(n)}$ in each selection environment and the likelihood of the environment-dependent vector $v^{(n)}$ in order to generate and collect samples $v^{(n)}$ in the next round of the first loop for the environment-dependent vector in each selection environment.

Next, on the eleventh to 14th lines, the learning processing section 150 executes processes in a third loop following the second loop in the first loop. The learning processing section 150 samples $w^{(m)}$ forming a posterior probability distribution on $m \in M$ by completing the third-loop processing.

First, on the twelfth line in the third loop, the learning processing section 150 generates a sample candidate $w\bullet^{(m)}$ for the preference vector in each selection environment from the distribution based on the distribution parameter $\Sigma_w$ of the prior distribution of the preference vector and the sample $w^{(m)}$ obtained in the previous first loop for the preference vector. For example, the learning processing section 150 samples $w\bullet^{(m)}$ (a dot above w in the figure) from a multidimensional normal distribution Normal ($w^{(m)}$, $\rho\Sigma_w$) where the mean is $w^{(m)}$ and the covariance is $\rho\Sigma_w$. In the initial firstloop processing, the initial value defined on the first line is given to $w^{(m)}$, and a value obtained in the previous first-loop processing is given to $w^{(m)}$ in the second round of the first-loop processing and beyond.

Next, on the 13th line, the learning processing section 150 determines, for each of the sample candidates $w\bullet^{(m)}$ for the preference vector, whether the sample candidate $w\bullet^{(m)}$ is selected as the next sample of the preference vector, based on the occurrence probability of the sample candidate $w\bullet^{(m)}$ in the prior distribution, and the likelihood of the sample candidate $w\bullet^{(m)}$ for selection in the history data and the preference vector of each selection subject.

Specifically, the learning processing section 150 calculates a divided value obtained by dividing the product of a probability density $\varphi(w\bullet^{(m)}|\mu_w, \Sigma_w)$ of the occurrence of $w\bullet^{(m)}$ from the multidimensional normal distribution where the mean is $\mu_w$ and the covariance is $\Sigma_w$ (that is, an occurrence probability density of $w\bullet^{(m)}$ in the prior probability distribution) and an infinite product $\Pi_m(k_n^{(m)}|v^{(n)}, w\bullet^{(m)})$ of $m \in M$ of the probability of selection of $k_n^{(m)}$ indicated by the history data when $v^{(n)}$ and $w\bullet^{(m)}$ are set as conditions (that is, the likelihood of $w\bullet^{(m)}$) by the product of a probability density $\varphi(w^{(m)}|\mu_w, \Sigma_w)$ of the occurrence of $w^{(m)}$ from a normal distribution where the mean is $\mu_w$ and the variance is $\Sigma_w$ (that is, an occurrence probability density of $w^{(m)}$ in the prior probability distribution) and an infinite product $\Pi_m(k_n^{(m)}|v^{(n)}, w^{(m)})$ of $n \in N$ of the probability of selection of $k_n^{(m)}$ indicated by the history data when $v^{(n)}$ and $w^{(m)}$ are set as conditions (that is, the likelihood of $w^{(m)}$). Then, the learning processing section 150 adopts, as new $w^{(m)}$, $w\bullet^{(m)}$ sampled with a lower probability between the calculated divided value and 1.

Therefore, the learning processing section 150 executes the third-loop processes on the twelfth and 13th lines to sample a candidate $w\bullet^{(m)}$ for the next sample from the multidimensional normal distribution based on the preference vector $w^{(m)}$ in each selection environment obtained as a result of the previous first-loop processing, and adopt the $w\bullet^{(m)}$ based on the prior distribution of the preference vector $w^{(m)}$ in each selection environment and the likelihood of the preference vector $w^{(m)}$ in order to generate and collect samples $w^{(m)}$ in the next round of the first loop for the preference vector in each selection environment.

Thus, each of elements of the preference vector of each selection subject and the environment-dependent vector in each selection environment is represented by the prior distribution, and the learning processing section 150 calculates the distribution parameters ($\mu_v$, $\Sigma_v$, $\mu_w$, and $\Sigma_w$) of the prior distribution on each element of the preference vector $w^{(m)}$ of each selection subject and the environment-dependent vector $v^{(n)}$ in each selection environment by learning based on Gibbs sampling in the processes of the third to sixth lines in the first loop.

Further, the learning processing section 150 performs sampling of the environment-dependent vector in each selection environment and the preference vector of each selection subject from the multidimensional normal distributions dominated by the previous samples to calculate the distributions of the environment-dependent vector $v^{(n)}$ in each selection environment and the preference vector $w^{(m)}$ of each selection subject based on the samples of the environment-dependent vector and the preference vector that occur multiple times. In other words, the learning processing section 150 performs learning based on the Metropolis-Hastings algorithm on $w^{(m)}$ and $v^{(n)}$ in the second-loop and third-loop processing.

The learning processing section 150 outputs the distribution of the preference vector $w^{(m)}$ on each selection subject m and the distribution of the environment-dependent vector $v^{(n)}$ on each selection opportunity n, which are finally obtained by collecting the adopted sample $w \bullet^{(m)}$ and sample $v \bullet^{(n)}$ after the first-loop processing, as respective posterior probability distributions. The learning processing section 150 may eliminate the influence of initial samples by not collecting samples obtained in the first-loop processing predetermined number of times after the start of the processing to execute the processes in FIG. 7.

Next, description will be made regarding a case where the learning processing section 150 performs approximate MAP estimation instead of the hierarchical Bayesian model to perform the learning processing in S130.

In this case, the learning processing section 150 uses an objective function based on the probability of selection in history data in response to the environment-dependent vector $v^{(n)}$ in each selection environment and the preference vector $w^{(m)}$ of each selection subject to calculate the environment-dependent vector $v^{(n)}$ in each selection environment and the preference vector $w^{(m)}$ of each selection subject.

For example, the learning processing section 150 optimizes the environment-dependent vector $v^{(n)}$ and the preference vector $w^{(m)}$ for history data including actually selected selection objects $k_n^{(m)}$ to maximize the posterior probability shown in Equation 2. The first term of Equation 2 corresponds to the likelihood of the environment-dependent vector $v^{(n)}$ and the preference vector $w^{(m)}$, and the second term and the third term correspond to the prior distributions of the environment-dependent vector $v^{(n)}$ and the preference vector $w^{(m)}$. The learning processing section 150 outputs the optimized environment-dependent vector $v^{(n)}$ and preference vector $w^{(m)}$ as the learning results.

$$\sum_{m \in M} \sum_{n \in N} \log p(k_n^{(m)} | v^{(n)}, w^{(m)}) - \lambda_1 \sum_{m \in M} \|w^{(m)} - \overline{w}\|^2 - \lambda_2 \sum_{n \in N} \|v^{(n)} - \overline{v}\|^2 \quad \text{Eq. 2}$$

Figure 9:
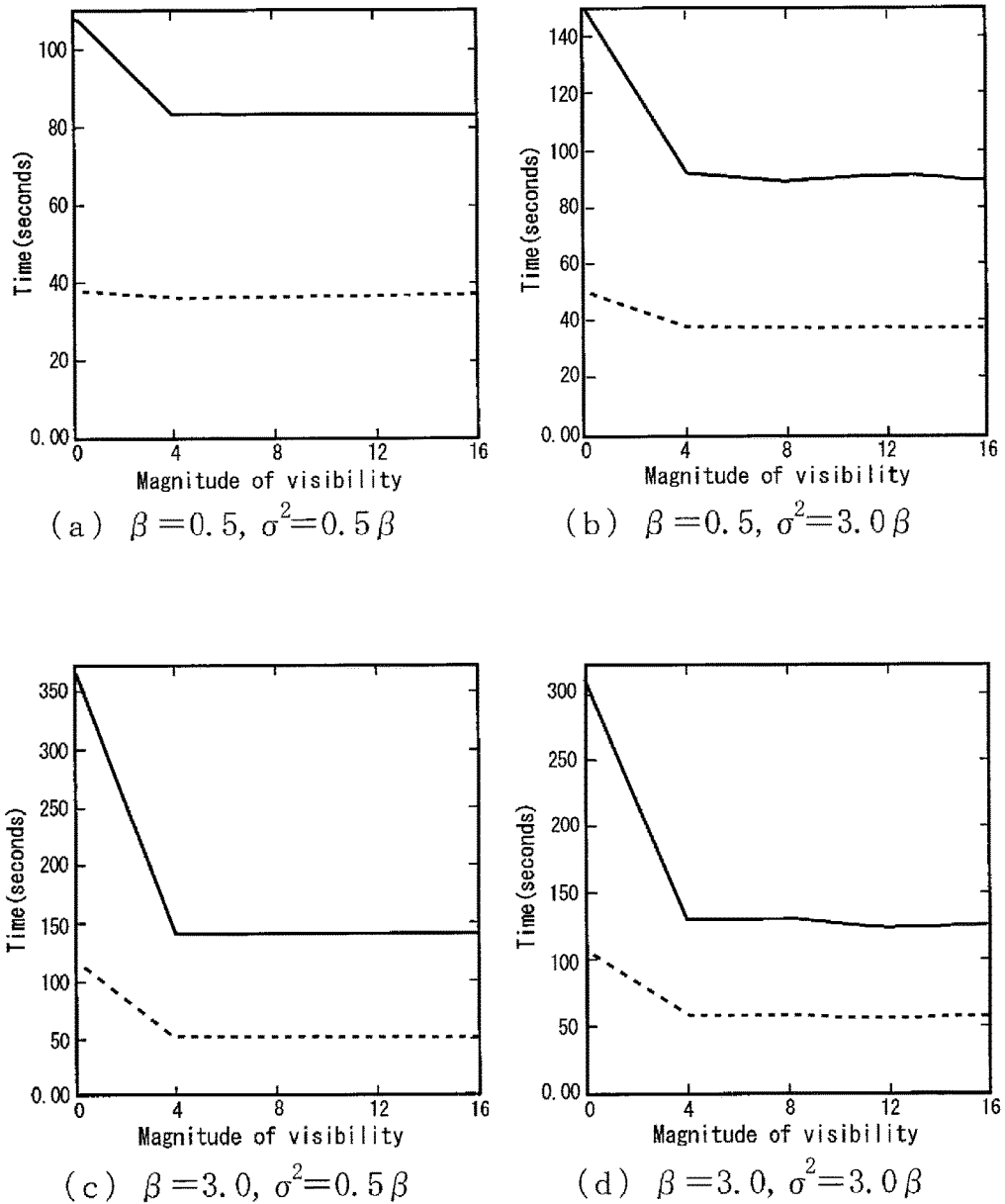
FIG. 9 shows the example of the effects of the information processing apparatus of the embodiment.

FIG. 8 and FIG. 9 show an example of the effects of the information processing apparatus 10 of the embodiment. The solid line in FIG. 8 shows the learning results of the selection probability by the choice model including the environmental dependence achieved by the information processing apparatus 10 of the embodiment using approximate MAP estimation. The dotted line shows the learning results of the selection probability using a conventional logit model that leaves the environmental dependence out of consideration.

The ordinate in the graphs of FIG. 8 shows the total sum of absolute errors between the probabilities of selection of a selection object by a selection subject estimated from test data and true selection probabilities used to generate the test data, and the abscissa shows the magnitude of influence of the environmental dependence in the choice model. The absolute error is expressed in Equation 3.

$$\sum_{m \in M} \sum_{n \in N} \sum_{\ell \in \mathcal{L}} |p(\ell | \tilde{w}^{(m)}, \tilde{v}^{(n)}) - p(\ell | w^{(m)}, v^{(n)})| \quad \text{Eq. 3}$$

The four graphs in FIG. 8 show the results of absolute errors when parameter β and parameter σ in the choice model are changed. The parameter β indicates a degree to which the selection subject makes a selection dependently on $w^{(m)}$ and $u^{(m)}$, where the tendency of the selection subject to select a selection object more randomly increases when the value is low. The parameter σ indicates the dispersiveness of preferences of selection subjects, where multiple selection subjects have a variety of preference vectors when the value is high.

As shown in the four graphs of FIG. 8, it is found that the information processing apparatus 10 of the embodiment estimates the selection probabilities more correctly with smaller absolute errors as a whole compared to the method using the conventional logit model. In particular, it is shown that the information processing apparatus 10 of the embodiment can perform estimation more correctly compared to the conventional method as the influence of the environmental dependence in the choice model increases (i.e., as the value on the abscissa increases).

The graphs in FIG. 9 show the temporal effects of the learning processing performed by the information processing apparatus 10. The abscissa is the same as in FIG. 8, and the ordinate shows the time required for the information processing apparatus 10 to perform the learning processing. As shown in the graphs of FIG. 9, it is found that the processing time of the information processing apparatus 10 of the embodiment falls within a generally acceptable range compared to the method using the conventional logit model, though the processing time increases a little.

Here, an information processing apparatus 10 according to a variation of the embodiment will be described. The information processing apparatus 10 of the embodiment learns an environment-dependent vector $v^{(n)}$ including the environmental dependence of each commercial product as an element on the assumption of a situation where the selection environment of the selection object at each selection opportunity is not known. However, when at least part of the selection environment is known, the information processing apparatus 10 according to the variation can perform learning in consideration of the selection environment.

For example, when a commercial product displayed in a department is known, the learning processing section 150 can keep the environmental dependence of a commercial product not on display at the selection opportunity low (e.g., −∞) during learning. This enables the learning processing section 150 to perform learning by reflecting the known situation of the department.

Figure 10:
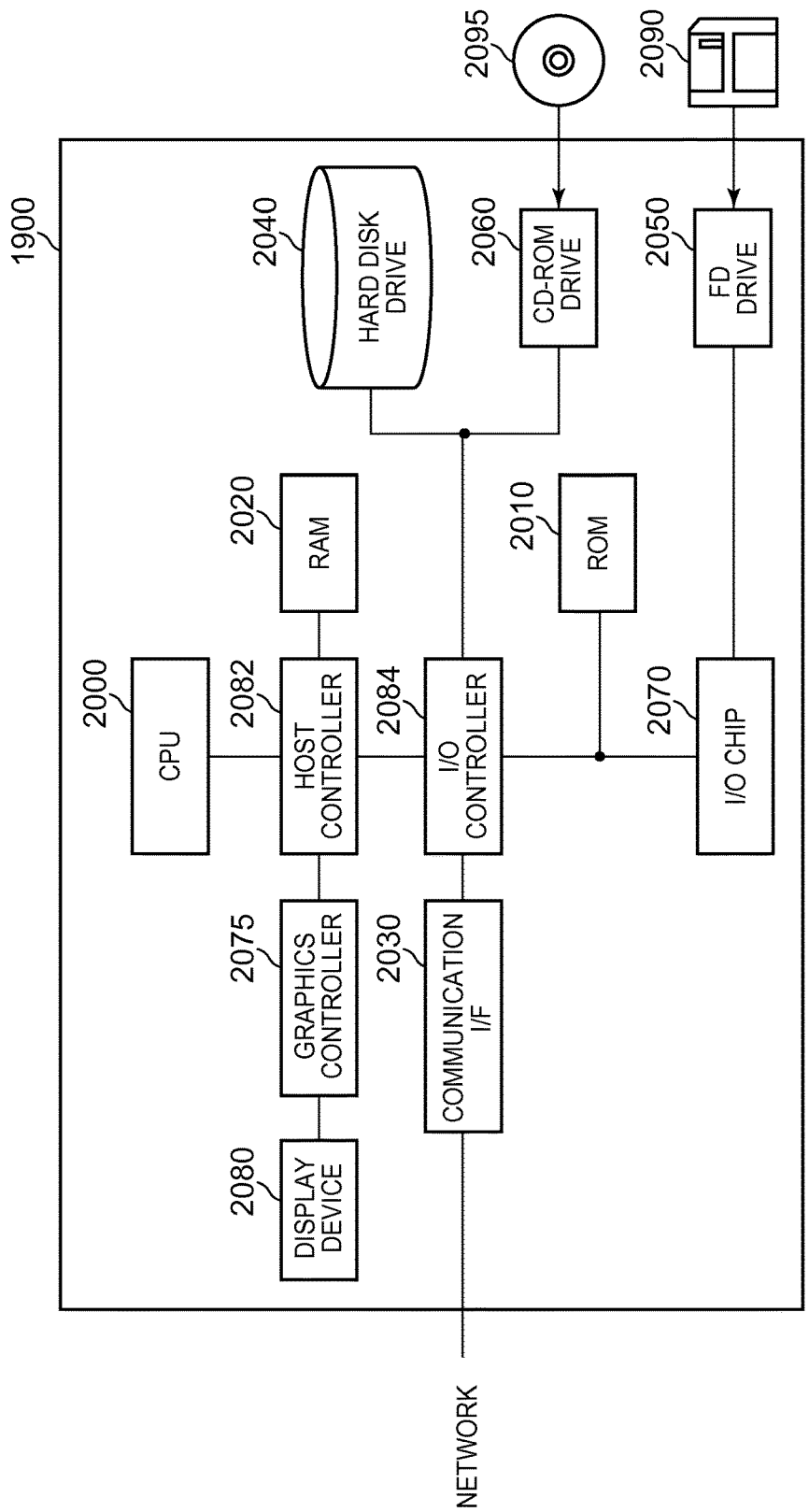
FIG. 10 shows an example of the hardware configuration of a computer.

FIG. 10 shows an example of the hardware configuration of a computer 1900 functioning as the information processing apparatus 10. The computer 1900 according to the embodiment includes: a CPU peripheral section having a CPU 2000, a RAM 2020, a graphics controller 2075, and a display device 2080, which are interconnected by a host controller 2082; an I/O section having a communication interface 2030, a hard disk drive 2040, and a CD-ROM drive 2060, which are connected to the host controller 2082 through an I/O controller 2084; and a legacy I/O section having a ROM 2010, a flexible disk drive 2050, and an I/O chip 2070 connected to the I/O controller 2084.

The host controller 2082 connects the RAM 2020 with the CPU 2000 and the graphics controller 2075, which access the RAM 2020 at a high transfer rate. The CPU 2000 operates based on programs stored in the ROM 2010 and the RAM 2020 to control each section. The graphics controller 2075 acquires image data generated on a frame buffer provided in the RAM 2020 by the CPU 2000 or the like, and displays the image on the display device 2080. Alternatively, the graphics controller 2075 may include therein a frame buffer for storing image data generated by the CPU 2000 or the like.

The I/O controller 2084 connects the host controller 2082 with the communication interface 2030, the hard disk drive 2040, and the CD-ROM drive 2060 as relatively high-speed I/O units. The communication interface 2030 communicates with other apparatuses through a network by wire or radio. Further, the communication interface functions as hardware for performing communication. The hard disk drive 2040 stores programs and data used by the CPU 2000 in the computer 1900. The CD-ROM drive 2060 reads a program or data from a CD-ROM 2095 and provides the read program or data to the hard disk drive 2040 through the RAM 2020.

Also connected to the I/O controller 2084 are relatively low-speed I/O units, i.e., the ROM 2010, the flexible disk drive 2050, and the I/O chip 2070. The ROM 2010 stores a boot program executed when the computer 1900 starts, and/or programs depending on the hardware of the computer 1900. The flexible disk drive 2050 reads a program or data from the flexible disk 2090, and provides the program or data to the hard disk drive 2040 through the RAM 2020. The I/O chip 2070 connects not only the flexible disk drive 2050 to the I/O controller 2084, but also various I/O devices to the I/O controller 2084 through a parallel port, a serial port, a keyboard port, and a mouse port, for example.

The program provided to the hard disk drive 2040 through the RAM 2020 is provided by the user in a form of being stored on a recording medium, such as a flexible disk 2090, a CD-ROM 2095, or an IC card. The program is read from the recording medium, installed in the hard disk drive 2040 within the computer 1900 through the RAM 2020, and executed by the CPU 2000.

Programs installed on the computer 1900 to cause the computer 1900 to function as the information processing apparatus 10 includes a feature value acquiring module, a history acquisition module, a learning processing module, a condition acquisition module, a simulation module, and an output module. These programs or modules may work on the CPU 2000 and the like to cause the computer 1900 to function as the feature value acquiring section 110, the history acquisition section 120, the learning processing section 150, the condition acquisition section 170, the simulation section 180, and the output section 190, respectively.

Information processes described in these programs are read into the computer 1900 to function as specific means implemented by software in corporation with the above-mentioned various hardware resources, i.e., as the feature value acquiring section 110, the history acquisition section 120, the learning processing section 150, the condition acquisition section 170, the simulation section 180, and the output section 190. Then, information is computed or processed by the specific means depending on the intended use of the computer 1900 in the embodiment to build a specific information processing apparatus 10 according to the intended use.

As an example, when the computer 1900 communicates with an external device or the like, the CPU 2000 executes a communication program loaded on the RAM 2020 to instruct the communication interface 2030 to perform communication processing based on the processing content described in the communication program. Under the control of the CPU 2000, the communication interface 2030 reads send data stored in a send buffer area or the like provided in a storage device, such as the RAM 2020, the hard disk drive 2040, the flexible disk 2090, or the CD-ROM 2095, to send the data to a network, or writes receive data received from the network to a receive buffer area provided in the storage device. Thus, the communication interface 2030 may transfer data exchanged with the storage device by the DMA (Direct Memory Access) method. Alternatively, the CPU 2000 may read data from the storage device or the communication interface 2030 as a source, and write the data to the communication interface 2030 or the storage device as a destination to transfer the send/receive data.

Further, the CPU 2000 reads, into the RAM 2020, all or necessary parts from files or databases stored in an external storage device, such as the hard disk drive 2040, the CD-ROM drive 2060 (CD-ROM 2095), or the flexible disk drive 2050 (flexible disk 2090) by means of DMA transfer or the like to perform various processing on the data on the RAM 2020. Then, the CPU 2000 saves the processed data back to the external storage device by means of DMA transfer or the like. In such processing, the RAM 2020 can be considered to temporarily holding the content of the external storage device. Therefore, in the embodiment, the RAM 2020, the external storage device, and the like are collectively referred to as the memory, the storage section, the storage device, or the like. For example, the storage section of the information processing apparatus 10 can store data received from/provided to the feature value acquiring section 110, the history acquisition section 120, the learning processing section 150, the condition acquisition section 170, the simulation section 180, and the output section 190 accordingly. For example, the storage section can receive and store data input from the feature value acquiring section 110 or the history acquisition section 120. Further, the storage section can store the results of learning by the learning processing section 150.

Various programs and various kinds of information, such as data, tables, and databases, in the embodiment are stored in such a storage device as targets of information processing. Note that the CPU 2000 can also hold part of the content of the RAM 2020 in a cache memory to perform reading and writing on the cache memory. Even in such a form, since the cache memory serves as part of the function of the RAM 2020, the cache memory shall be included in the RAM 2020, the memory, and/or the storage device in the embodiment unless otherwise denoted distinctively.

Further, the CPU 2000 performs various processing on the data read from the RAM 2020 as specified in a sequence of instructions of a program including various arithmetic operations, information processing, conditional determinations, and searching and replacing information described in the embodiment, and saves the processed data back to the RAM 2020. For example, when a conditional determination is made, the CPU 2000 compares any of various variables shown in the embodiment with any other variable or constant to determine whether it meets a condition, such as larger, smaller, not less than, not more than, or equal to, and when the condition is satisfied (or unsatisfied), the procedure branches to a different sequence of instructions or calls a subroutine.

Further, the CPU 2000 can retrieve information stored in a file or a database in the storage device. For example, when two or more entries are stored in the storage device in such a manner to associate the attribute value of a second attribute with the attribute value of a first attribute, the CPU 2000 searches the two or more entries stored in the storage device for an entry with the attribute value of the first attribute matching with a specified condition to read the attribute value of the second attribute stored in the entry so that the attribute value of the second attribute associated with the first attribute that meets a predetermined condition can be obtained.

While the present invention has been described with reference to the embodiment, the technical scope of the present invention is not limited to the description of the aforementioned embodiment. It will be obvious to those skilled in the art that various changes and modifications can be added to the aforementioned embodiment. From the appended claims, it will also be obvious that forms to which such changes or modifications are added shall be included in the technical scope of the present invention.

Further, when multiple elements are recited in the description of the embodiment, any element other than the recited elements may also be used. For example, when it is described that X executes Y using A, B, and C, X may also execute Y using D in addition to A, B, and C.

The operations, the procedure, the steps, and the execution sequence of processes such as stages in the apparatus, system, program, and method described in the appended claims and the specification, and shown in the accompanying drawings are not particularly specified as "ahead of," "prior to," or the like. It should be noted that the operations and the like can be carried out in any order unless output of the previous process is used in the subsequent process. In the appended claims, the specification, and the operation flows in the drawings, "first," "next," and the like are used for convenience sake, but it does not mean that it is imperative to carry out the operations and the like in this order.

REFERENCE SIGNS LIST

10: information processing apparatus,
110: feature value acquiring section,
120: history acquisition section,
150: learning processing section,
170: condition acquisition section,
180: simulation section,
190: output section
1900: computer,
2000: CPU,
2010: ROM,
2020: RAM,
2030: communication interface,
2040: hard disk drive,
2050: flexible disk drive,
2060: CD-ROM drive,
2070: I/O chip,
2075: graphics controller,
2080: display device,
2082: host controller,
2084: I/O controller,
2090: flexible disk,
2095: CD-ROM

The invention claimed is:

1. An information processing apparatus, comprising:
a memory; and
a processor, wherein the processor is configured to:
acquire history data including a history indicating that a plurality of selection subjects have selected selection objects;
execute a choice model to learn a preference of each selection subject for a feature and an environmental dependence of selection of each selection object in each selection environment using the history data, where the choice model uses a feature value possessed by each selection object, the preference of each selection subject for the feature, and the environmental dependence indicative of ease of selection of each selection object in each of a plurality of selection environments to calculate a selectability with which each of the plurality of selection subjects selects each selection object;
execute the choice model to learn, where the choice model uses a feature vector indicative of a plurality of feature values corresponding to a plurality of features of each selection object, a preference vector of each selection subject indicative of a preference for each of the plurality of features, and an environment-dependent vector for each selection environment indicative of an environmental dependence of selection of each selection object,
wherein the choice model calculates the selectability, with which each selection subject selects each selection object in each selection environment, based on a product of the feature vector of the selection object and the preference vector of the selection subject, and an element corresponding to the selection object in the environment-dependent vector corresponding to the selection environment,
wherein each of elements of the preference vector of each selection subject and the environment-dependent vector in each selection environment is represented by a prior distribution;
calculate and generate distribution parameters of the prior distribution on each of the elements of the preference vector of each selection subject and the environment-dependent vector in each selection environment by learning;
generate a next sample of the environment-dependent vector in each selection environment based on the prior distribution of the environment-dependent vector in each selection environment;
generate a next sample of the preference vector of each selection subject based on the prior distribution of the preference vector of each selection subject;
calculate distributions of the environment-dependent vector in each selection environment and the preference vector of each selection subject based on the samples of the environment-dependent vector in each selection environment and the preference vector of each selection subject that occur multiple times, wherein the calculation of the distributions of the environment-dependent vector in each selection environment and the preference vector of each selection subject matches the choice model;

simulate learned results obtained by the choice model learning the preference of each selection subject, wherein the preference of each selection subject is based on the calculated distributions of the environment-dependent vector in each selection environment and the preference vector of each selection subject; and output the simulation of the learned results on a display.

2. The information processing apparatus of claim 1 further configured to learn the feature value for the feature possessed by each of a plurality of the selection objects in the choice model.

3. The information processing apparatus of claim 1, further configured to acquire the feature value for the feature possessed by each of a plurality of the selection objects.

4. The information processing apparatus of claim 1, wherein the history data includes a history indicating that at least one selection subject has selected a selection object in each of the plurality of selection environments, the information processing apparatus further configured to:

execute the choice model to learn, based on the environmental dependence of each selection object common to the plurality of selection subjects in each selection environment, one or more influences having an effect on the plurality of selection subjects, wherein the one or more influences have no immediate relationship to the plurality of selection subjects.

5. The information processing apparatus of claim 1, further configured to:

generate a sample candidate for the environment-dependent vector in each selection environment from a distribution based on the distribution parameters of the prior distribution of the environment-dependent vector and a previous sample of the environment-dependent vector; and determine whether to select each of sample candidates for the environment-dependent vector as a next sample of the environment-dependent vector based on an occurrence probability of the sample candidate for the prior distribution, and a likelihood of the sample candidate for selection in the history data and the preference vector of each selection subject.

6. The information processing apparatus of claim 1, further configured to:

generate a sample candidate for the preference vector of each selection subject from a distribution based on the distribution parameters of the prior distribution of the preference vector and a previous sample of the preference vector; and determine whether to select each of sample candidates for the preference vector of each selection subject as a next sample of the preference vector based on an occurrence probability of the sample candidate for the prior distribution, and a likelihood of the environment-dependent vector in each selection environment for selection in the history data and the sample candidate.

7. The information processing apparatus of claim 1, further configured to:

calculate the environment-dependent vector in each selection environment and the preference vector of each selection subject using an objective function based on a probability of selection in the history data in response to the environment-dependent vector in each selection environment and the preference vector of each selection subject.

8. The information processing apparatus of claim 1, wherein the choice model calculates the selectability using the equation:

$$p(k \mid w^{(m)}, v^{(n)}) \equiv \frac{\exp(w^{(m)\top} u^{(k)} + v_{n,k})}{\sum_{i \in L} \exp(w^{(m)\top} u^{(i)} + v_{n,l})},$$

where $p(k|w(m), v(n))$ is the selectability, m is each selection subject, k is each selection object, n is a selection opportunity, u(k) is the feature vector, u(l) is the preference vector, w(m) is at least one of the selection subjects, vn,k is the element corresponding to the selection object in the environment-dependent vector, where the environment-dependent vector is v(n).

* * * * *